(12) United States Patent
Ozeki et al.

(10) Patent No.: US 6,752,128 B2
(45) Date of Patent: Jun. 22, 2004

(54) INTAKE SYSTEM FAILURE DETECTING DEVICE AND METHOD FOR ENGINES

(75) Inventors: Jun Ozeki, Nagoya (JP); Junya Morikawa, Toyota (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/440,324

(22) Filed: May 19, 2003

(65) Prior Publication Data

US 2003/0230287 A1 Dec. 18, 2003

(30) Foreign Application Priority Data

Jun. 12, 2002 (JP) ........................................ 2002-171416
Sep. 5, 2002 (JP) ........................................ 2002-260443

(51) Int. Cl.[7] .............................................. F02M 51/00
(52) U.S. Cl. ........................ 123/479; 73/118.2; 123/480
(58) Field of Search ................................ 123/474, 480, 123/445, 184.21; 73/117.3, 118.2

(56) References Cited

FOREIGN PATENT DOCUMENTS

| JP | 3-16498 | 3/1991 |
|---|---|---|
| JP | 5-280403 | 10/1993 |
| JP | 2518317 | 5/1996 |
| JP | 2901612 | 3/1999 |
| JP | 3055357 | 4/2000 |

*Primary Examiner*—Bibhu Mohanty
(74) *Attorney, Agent, or Firm*—Nixon & Vanderhye P.C.

(57) ABSTRACT

A throttle opening range is divided into regions corresponding to the opening positions, and a deviation between an actual intake air suction state and a predetermined suction state provided for each of the divided regions is calculated. Intake system abnormality such as air cleaner clogging or intake pipe leakage is determined, if the deviation changes in a predetermined increasing or decreasing direction over a plurality of the divided regions. The air suction state may be represented by an intake pipe pressure or intake air flow quantity.

40 Claims, 10 Drawing Sheets

| SPD | α (deg) ΔP₁ | 0 | 20 | 40 | 60 | 80 |
|---|---|---|---|---|---|---|
| ABOVE 4km/h | 10kPa | 4000rpm | 5000rpm | 6000rpm | 6800rpm | 6800rpm |
| | 20kPa | 3500rpm | 4500rpm | 5500rpm | 6000rpm | 6800rpm |
| | 30kPa | 3000rpm | 4000rpm | 5000rpm | 6000rpm | 6000rpm |
| | 40kPa | 2500rpm | 3500rpm | 4500rpm | 5500rpm | 5500rpm |
| | 50kPa | 2000rpm | 3000rpm | 4000rpm | 5000rpm | 5000rpm |
| BELOW 4km/h | | 2000rpm | | | | |

SPD≧4km/h AND α≧5deg

| ΔP₁ | 10kPa | 20kPa | 30kPa | 40kPa | 50kPa |
|---|---|---|---|---|---|
| Cr | 1 | 1 | 0.95 | 0.9 | 0.8 |

SPD<4km/h OR α<5deg

| ΔP₁ | 10kPa | 20kPa | 30kPa | 40kPa | 50kPa |
|---|---|---|---|---|---|
| Cr | 0.95 | 0.9 | 0.8 | 0.7 | 0.7 |

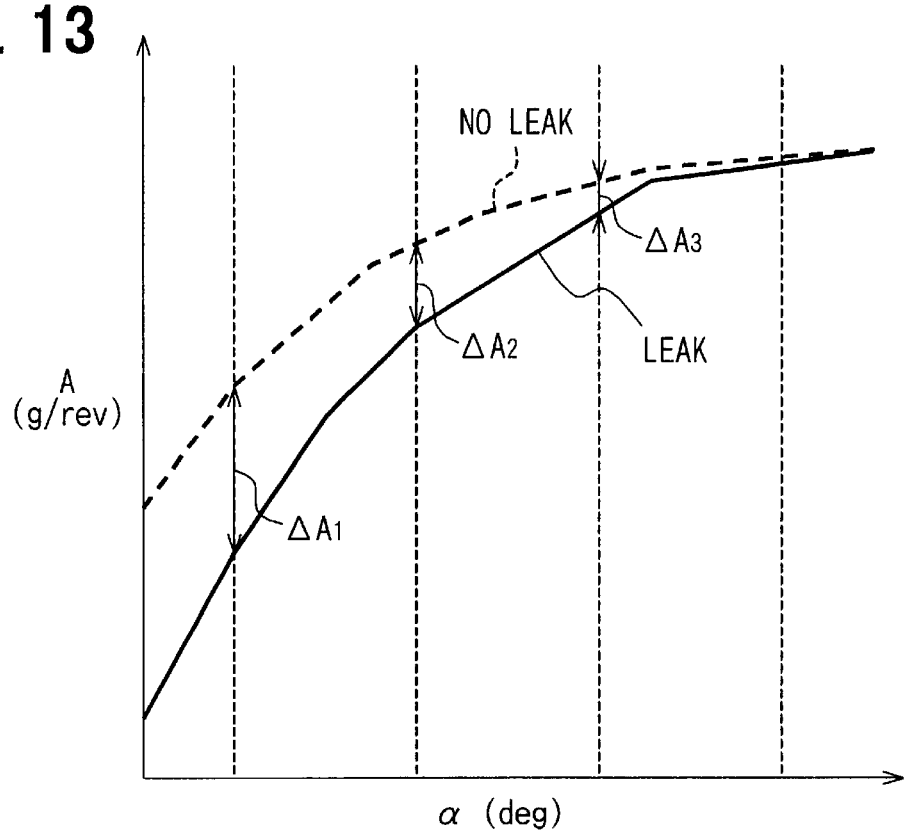

INTAKE SYSTEM FAILURE DETECTING DEVICE AND METHOD FOR ENGINES

CROSS REFERENCE TO RELATED APPLICATION

This application is based on and incorporates herein by reference Japanese Patent Applications No. 2002-171416 filed on Jun. 12, 2002 and No. 2002-260443 filed on Sep. 5, 2002.

FIELD OF THE INVENTION

The present invention relates to a failure detecting device and method for detecting a failure of an intake system of internal combustion engines in, for example, vehicles and so on.

Air cleaner is provided in an intake passage of an internal combustion engine to eliminate foreign matters, such as dust, or the like, contained in air. When foreign matters, such as dust, or the like, accumulate in the air cleaner, they become intake resistance when air is introduced into the internal combustion engine.

Conventionally, JP-3055357 discloses a device for detecting a failure of an intake system. In this technology, a throttle valve is adjusted to afford a predetermined quantity of air. Accordingly, an opening position of the throttle valve is controlled at all times to afford a predetermined quantity of air as required. In such a control of the throttle valve, clogging of an air cleaner is detected by the comparison of an actual throttle opening position when a quantity of air sucked by an internal combustion engine becomes a predetermined quantity and a preset throttle opening position. The preset throttle opening position is an opening position of the throttle valve, by which the predetermined air quantity is attained in a state, in which foreign matters, such as dust, or the like, are not entrained in the air cleaner.

That is, since an increase in intake resistance is caused when foreign matters, such as dust, or the like, accumulate in the air cleaner, an opening position of the throttle valve is controlled to become larger in order to afford the predetermined air quantity. Hereupon, clogging of the air cleaner is detected by the comparison of an actual throttle opening position and a preset throttle opening position.

Since the above device detects clogging when the predetermined air quantity is afforded, however, there is a possibility that in the case where foreign matters are increased in accumulation to increase the intake resistance, the predetermined air quantity cannot be afforded and the detection of clogging cannot be performed even when the throttle valve is regulated.

The internal combustion engine is supplied with fuel by a fuel injection system. One type of fuel injection control system is referred to as a D-J system for detecting, as a parameter of an intake air sucking state, an intake pressure downstream of the throttle valve to determine a fundamental fuel injection quantity in accordance with the intake pressure and an engine speed. The other type of fuel injection control system is referred to as an L-J system for detecting, as a parameter of the intake air sucking state, the intake air quantity upstream of the throttle valve to determine the fundamental fuel injection quantity in accordance with the intake air quantity and an engine speed.

Hereupon, when gas-tightness of the intake system is damaged (a leakage abnormality) due to disengagement and fracture of pipes, such as an intake manifold, or the like, downstream of the throttle valve, air flows into the intake system from a location, in which leakage abnormality is present, because of a negative pressure downstream of the throttle valve, so that the air quantity taken into a cylinder becomes larger than the air quantity passing through the throttle valve.

In the internal combustion engine of the D-J system, the intake pressure rises relative to that in a normal state since air flows into the intake system from a location, in which leakage abnormality is present. Correspondingly, the fuel injection quantity becomes excessively larger than required, and the engine speed is excessively increased. Thus, deceleration becomes hard, and an idling speed is increased, thereby incurring a worse fuel consumption and an increase in exhaust gases.

Also, in the internal combustion engine of the L-J system, corresponding to air in flowing from a location, in which leakage abnormality is present, the intake air quantity actually taken into the cylinder becomes excessive relative to the detected intake quantity. Thus it gets into an over-lean fuel condition, which will incur engine stall, bad drivability, and degradation in cleanliness of exhaust gases.

Therefore, there is a need of taking fail-safe measures to detect leakage abnormality in the intake system and to warn a driver.

For example, in the D-J system disclosed in JP 2518317, an upper limit intake pressure is set according to a throttle opening position. When the detected intake pressure exceeds the upper limit intake pressure, it is determined that leakage abnormality is present downstream the throttle valve in an intake system. The rotation speed of the internal combustion engine above which fuel injection is inhibited (fuel cut-off) as fail-safe measures is lowered.

Also, in the D-J system disclosed in JP-B2-3-16498, the intake pressure is assumed according to the throttle opening position and the engine speed. When the detected intake pressure exceeds the assumed intake pressure, the fuel injection quantity is fixed to a predetermined value.

Also, in the L-J system disclosed in JP-A-5-280403, the basic injection quantity is estimated on the basis of the throttle opening position and the engine speed. In the case where the actual injection quantity is smaller than the basic injection quantity and correction of a fuel injection quantity performed by air-fuel ratio causes an increase in the injection quantity, it is determined that leakage abnormality is present in the intake system.

In the above conventional systems, sensors for detecting the intake pressure and the intake air quantity are used. However, in the case where owing to variation in characteristics, such sensors generate errors in output detection values relative to actual values, it is likely to determine the intake system, in which leakage abnormality is present, to be normal.

In JP 2901612, in a transient state, such as an engine start or the like, the threshold value for determining whether a leakage abnormality is present is corrected in a manner to enlarge a tolerance, which is determined to be normal, thereby avoiding an erroneous determination. In the case where abnormality is actually present, however, it is likely to fail to detect it. Thus, such measures are not necessarily adequate.

SUMMARY OF THE INVENTION

The present invention has its first object to provide an intake system failure detecting device and method capable of surely detecting clogging of air cleaner even in the case where foreign matters are increased in accumulation to increase an intake resistance.

The present invention has its second object to provide an intake system failure detecting device and method capable of detecting leakage abnormality in an intake system.

For attaining the first object, according to the present invention, an actual load of an internal combustion engine and an opening position of a throttle valve are detected. A reference load of the internal combustion engine is predetermined for each opening position of the throttle valve. Whether a failure is present in the intake system is determined based on the detected actual load and the predetermined reference load for each opening position of the throttle valve.

For attaining the second object, according to the second invention, leakage abnormality of an intake system downstream a throttle valve is determined by making a comparison between a detection value of an intake air sucking state and a reference value of an intake air sucking state at the time of normality free from the leakage abnormality. The reference value is set in correspondence with a load on the internal combustion engine. The leakage abnormality is determined when the difference between the detection value and the reference value in each of a plurality of loads different in magnitude becomes larger as the load becomes lower.

BRIEF DESCRIPTION OF THE DRAWINGS

The above and other objects, features and advantages of the present invention will become more apparent from the following detailed description made with reference to the accompanying drawings. In the drawings:

FIG. 13 is a graph illustrating processing for detection of leakage abnormality present in the intake system;

FIG. 14 is a table illustrating processing for detection of leakage abnormality present in the intake system; and FIG. 15 is a table illustrating a modified example of processing for detection of leakage abnormality generated in the intake system.

DETAILED DESCRIPTION OF PREFERRED EMBODIMENTS (First Embodiment)

Figure 1:
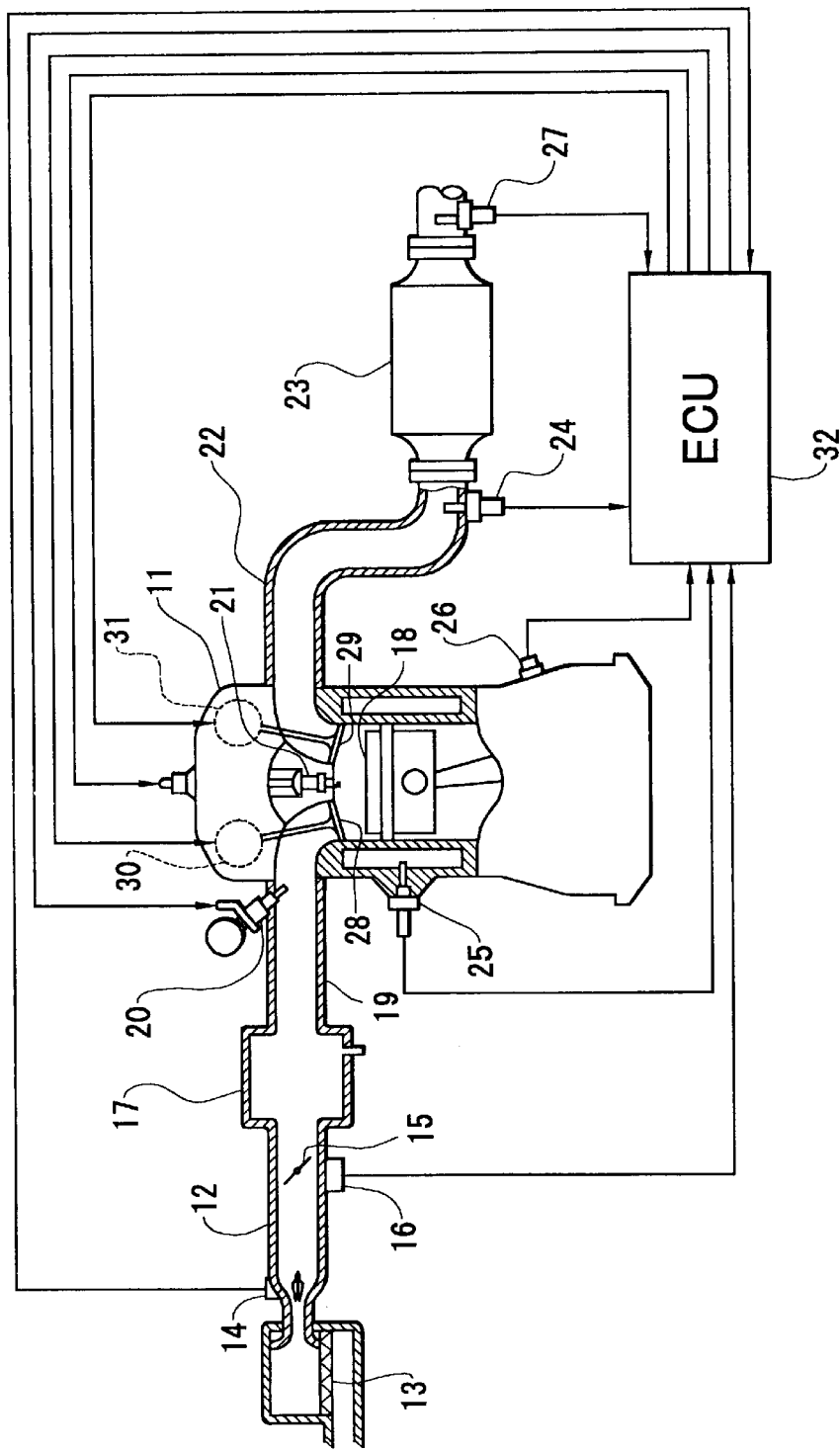
FIG. 1 is a schematic view showing an engine system to which a first embodiment of the present invention is applied.

Referring first to FIG. 1, an internal combustion engine 11 is loaded on a vehicle. Connected to the engine 11 is an intake passage 12 for conducting air to a combustion chamber. An air cleaner as an air purifier is mounted at an upstream end (left end in FIG. 1) of the intake passage 12. Mounted in a casing of the air cleaner is a filter (element) 13, which catches foreign matters such as dirt, dust, or the like when an intake air passes therethrough.

A butterfly type throttle valve 15 is arranged downstream of the air cleaner in the intake passage 12. The throttle valve 15 is turnably supported by a shaft within the intake passage 12. The throttle valve 15 operates to adjust a quantity of intake air flowing through the intake passage 12 to control an output of the engine 11. A throttle opening position sensor 16 is arranged in the vicinity of the throttle valve 15. The throttle opening position sensor 16 is mechanically coupled to the shaft of the throttle valve 15 to convert a rotating displacement (throttle opening position θ) of the shaft into an electric signal.

A hot-wire type airflow meter 14 is mounted in the intake passage 12 on an upstream side of the throttle valve 15. The sensor 14 of this type controls a hot-wire in a manner to keep the same at a constant temperature. Since temperature of the hot-wire is influenced by a flow rate of the intake air, a voltage value is varied according to a change in a flow rate of the intake air when the temperature of the hot-wire is to be controlled at a constant temperature. Accordingly, it is possible to detect an intake air quantity Q on the bases of the voltage value.

Also, an alarm lamp (not shown) for informing an operator of clogging of the filter 14 of the air cleaner is provided on an instrument panel of the vehicle. The alarm lamp is connected electrically to an output side of an electronic control unit (engine ECU) 32 for engine control. The throttle opening position sensor 16 and the airflow meter 14 are connected to an input side of the engine ECU 32.

A surge tank 17 is provided to suppress pulsation of intake air supplied to respective combustion chambers of the engine 11. Provided as an intake passage extending to the combustion chambers of the engine 11 from the surge tank 17 is an intake manifold 19 branching to feed intake air to the respective combustion chambers.

Intake valves 28 are opened to permit a fuel-air mixture of an intake air and a fuel injected from injectors 20 to be fed to the respective combustion chambers. The fuel-air mixture supplied to the combustion chambers is compressed upon lifting of a piston 18 and used for combustion by spark ignition of an ignition plug 21. Pressure generated by combustion forces down the piston 18 to generate a driving force of the engine.

Combustion gas generated by combustion is conducted to an exhaust passage 22 upon opening of exhaust valves 29.

Here, the intake valve 28 and the exhaust valve 29 perform opening and closing motions in synchronism with predetermined rotating angles of a crankshaft, and valve opening and closing timing varying mechanisms 30, 31 can cause advance or delay of the opening and closing motions relative to the rotating angle of the crankshaft. Accordingly, it is possible to optionally set opening and closing timings relative to a rotating angle of the crank shaft. The valve opening and closing timing varying mechanisms make use of hydraulic pressure of the engine 11 to optionally set opening and closing timings of the intake valve 28 and the exhaust valve 29 relative to a rotating angle of the crank shaft.

Hereupon, the combustion gas contains hazardous components. Therefore, a catalyst converter 23 is provided on a downstream side of the exhaust passage 22 to purify the hazardous components to discharge a combustion gas to the atmosphere. The catalyst converter 23 is varied in its hazardous component purifying performance depending upon air/fuel ratio. The air/fuel ratio, which presents a best efficiency of purification, is known to be a stoichiometric air/fuel ratio.

That is, in view of the purifying performance of the catalyst converter 23, the purifying performance of the catalyst converter 23 can be most efficiently made use of by means of control such that air/fuel ratio detected by an oxygen concentration sensor 27 provided on a downstream side of the catalyst converter 23 becomes the stoichiometric air/fuel ratio. In view of this, a sub-feedback control is performed to correct a target air/fuel ratio on an upstream side of the catalyst converter 23 so that a rich/lean periodic ratio and/or amplitude ratio of air/fuel ratio detected by the oxygen concentration sensor 27 becomes the same (near the stoichiometric air/fuel ratio). Also, a main feedback control is performed so that air/fuel ratio detected by a linear A/F sensor 24 becomes a target air/fuel ratio corrected in the sub-feedback control.

In addition, a vehicle speed sensor (not shown) and an engine speed sensor 26 are connected to the input side of the engine ECU 32 to be used in control of the engine 11. The engine ECU 32 determines a clogging state of the air cleaner 3 on the basis of respective signals from the airflow meter 14 and the throttle opening position sensor 16 to control an operation of the alarm lamp in accordance with results of the determination.

When the engine 11 with the intake system failure detecting device is operated, a target quantity of intake air is set and a throttle opening position preset in a manner to meet the target quantity of intake air is set according to an operating state.

When foreign matters, such as dirt, dust, or the like, are entrained in an intake air flowing into the intake passage 12 in a state, in which clogging is not generated in the air cleaner, they are caught by the filter 13 of the air cleaner when passing through the air cleaner 13. The purified intake air, from which foreign matters have been removed, passes through the throttle valve 15 to be taken into the engine 11. At this time, a quantity of intake air sucked into the engine 11 is adjusted in response to an opening position of the throttle valve 15. Also, output of the engine 11 is controlled according to the quantity of intake air.

In the engine 11, the longer its operating time, the more an amount of foreign matters caught by the filter 13 to be accumulated. An increase of the foreign matters presents an intake resistance, when air is taken in, to decrease a quantity of intake air passing through the air cleaner. At this time, even when a throttle opening position is fixed, a deviation between air cleaner target intake air quantity Qtg and an actual air quantity Qa detected by the air flow meter 14 is increased as foreign matters are increased in quantity.

Figure 2:
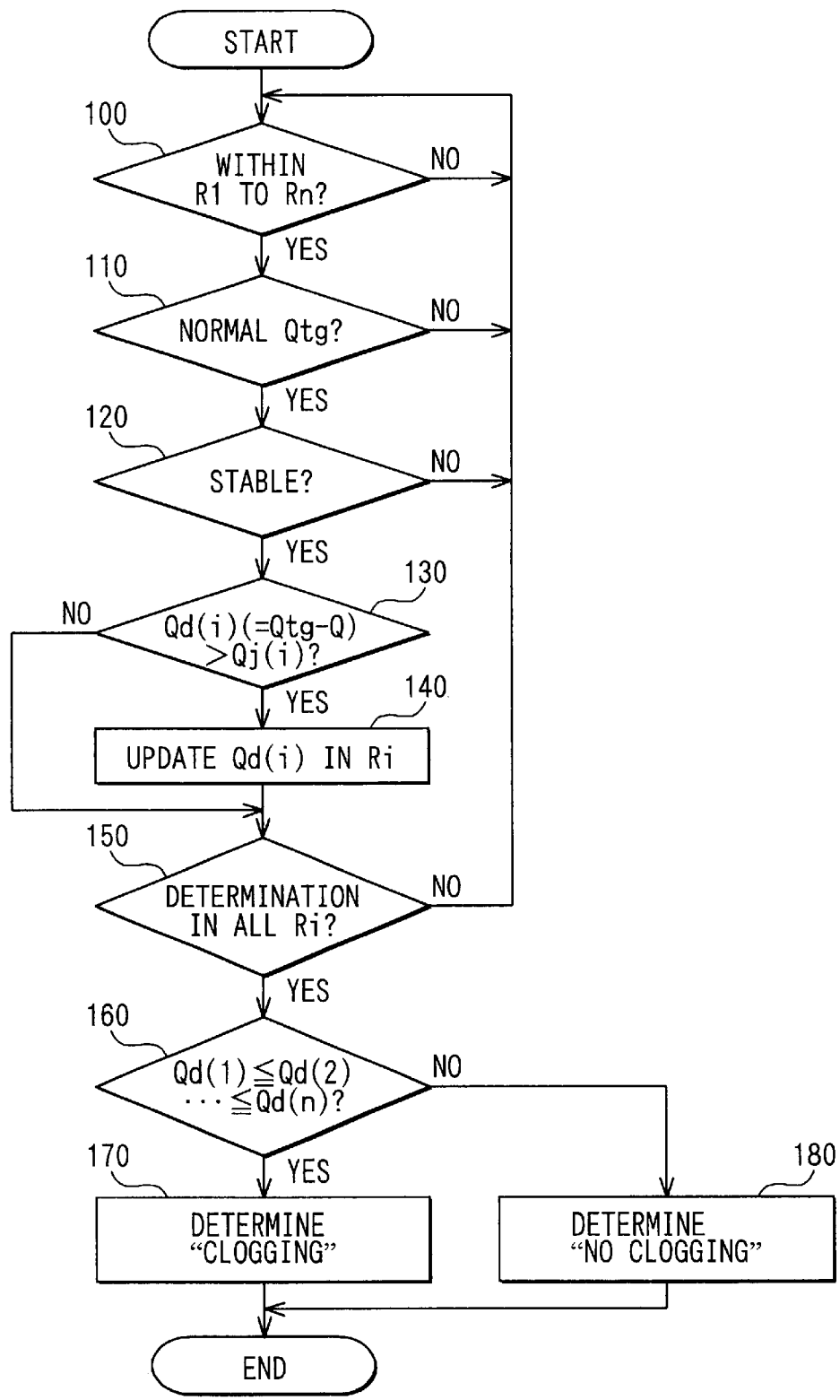
FIG. 2 is a flowchart showing processing in a clogging detecting routine executed by an engine ECU in the first embodiment of the present invention.

FIG. 2 is a flowchart showing an intake system failure detecting routine, in which clogging of the air cleaner is detected, among respective processing prosecuted by the engine ECU 32, the routine being started up at a predetermined timing.

When the processing of the routine is started, the engine ECU 32 first determines at step 100 whether an opening position α of the throttle valve 15 detected by the throttle opening position sensor 16 ranges in a region from a region R1 to a region Rn. The region R1 on the smaller opening position side is set so that a decrease in a quantity of intake air Q caused by clogging of the air cleaner is detectable. That is, the region R1 does not include the throttle opening position of 0° (near the full closure of the throttle). The region Rn on the larger opening position side is set to include the maximum opening position of the throttle valve 15.

When it is determined that the throttle opening position is not in a region corresponding to the region R1 to the region Rn, step 100 outputs a negative determination (NO) and the processing is returned to step 100. Meanwhile, when the processing at step 100 results in a positive determination (YES), the processing proceeds to step 110. This processing is assumedly related to a region Ri. At step 110, it is determined whether a target intake air quantity Qtg is in a predetermined range (normal Qtg) set for each region R1 to Rn.

When it is determined that the target intake air quantity Qtg is not in the predetermined range, step 110 outputs a negative determination (NO) and the processing is again returned to step 100. Meanwhile, when it is determined that a target intake air quantity Qtg is in the predetermined range, step 110 outputs a positive determination (YES), and the processing proceeds to step 120.

It is determined at step 120 whether an operating state is stable. It suffices as measures of such determination that, for example, an engine rotating speed NE, opening and closing timings of intake valve and exhaust valve in the valve opening and closing timing varying mechanisms 30, 31, cooling water temperature, ignition timing, and soon are in predetermined ranges, which are set for them.

The reason why the operating state is determined is that an actual intake air quantity Q detected corresponding to the throttle opening position is varied also under the influence of an operating state of the internal combustion engine. Meanwhile, the target intake air quantity Qtg is a value preset corresponding to the throttle opening position. Accordingly, in the case where the actual quantity of intake air is influenced by the operating state of the internal combustion engine, there is a possibility of bringing about erroneous detection. Hereupon, when it is determined that the operating state is unstable, step 120 outputs a negative determination (NO) and the processing is again returned to step 100. Meanwhile, when it is determined that the operating state is stable, step 120 outputs a positive determination (YES), and the processing proceeds to step 130.

It is determined at step 130 whether a deviation (referred below to as Qd(i)) between a target intake air quantity Qtg in the region i and an actual intake air quantity Q detected by the airflow meter 14 is more than a predetermined value Qj(i). The predetermined value Qj(i) is a determination value variable with a throttle opening position. It is set to be larger as the throttle opening position increases, and to be smaller as the throttle opening position decreases. This is because the deviation Qd(i) becomes larger as the throttle opening increases in the case where dirt, dust, or the like causes generation of clogging on the air cleaner.

In the case where the deviation Qd(i) is smaller than the determination value Qj(i) corresponding to a throttle opening position, step 130 outputs a negative determination (NO) and the processing proceeds to step 150. Meanwhile, in the case where the deviation Qd(i) is larger than the determination value Qj(i) corresponding to a throttle opening position, step 130 outputs a positive determination (YES), and the processing proceeds to step 140.

At step 140, the deviation Qd(i) is stored in a predetermined address corresponding to the region i of a RAM of the ECU 32 in order to update the deviation Qd(i), and the processing proceeds to step 150. At step 150, it is determined whether all deviations Qd(i) in the region R1 to the region Rn have been determined.

Here, when determination of deviations (Qd(1) to Qd(n)) has not been made for all the regions R1 to Rn, the processing returns to step 100. Meanwhile, when it is determined that determination of deviations Qd(i) have been made for all the regions, step 150 outputs a positive determination (YES), and the processing proceeds to step 160. At step 160, relationships among from the deviation Qd(1) to the deviation Qd(n) are determined. Specifically, it is determined whether the deviation Qd(1), a deviation Qd(2), and a deviation Qd(3) become larger in this order as the regions proceed from R1 to Rn.

Here, when it is determined that the deviations Qd(i) do not become larger in the order of the regions from R1 to Rn, the processing proceeds to step 180 and the routine is terminated determining that there is no clogging. Meanwhile, when the deviations Qd(i) become larger in the order of the regions from R1 to Rn, step 160 outputs a positive determination (YES), and the processing proceeds to step 170. At step 170, it is determined that there is clogging, and an alarm lamp (not shown) is lighted up to warn a driver of the fact that the air cleaner has clogging. Also, at step 170, receiving the fact that clogging is occurring in the air cleaner, other abnormal diagnoses are inhibited.

Thereby, it is possible to prevent erroneous detection of clogging due to detection of other diagnoses of abnormality.

In addition, it suffices in other abnormal diagnoses that a predetermined abnormality be detected on the basis of the relationship between a throttle opening position and an actual load. Accordingly, other abnormal diagnoses suffice to be measures of detecting a predetermined abnormality on the basis of a quantity of intake air supplied into an internal combustion engine and an intake pressure.

Figure 3:
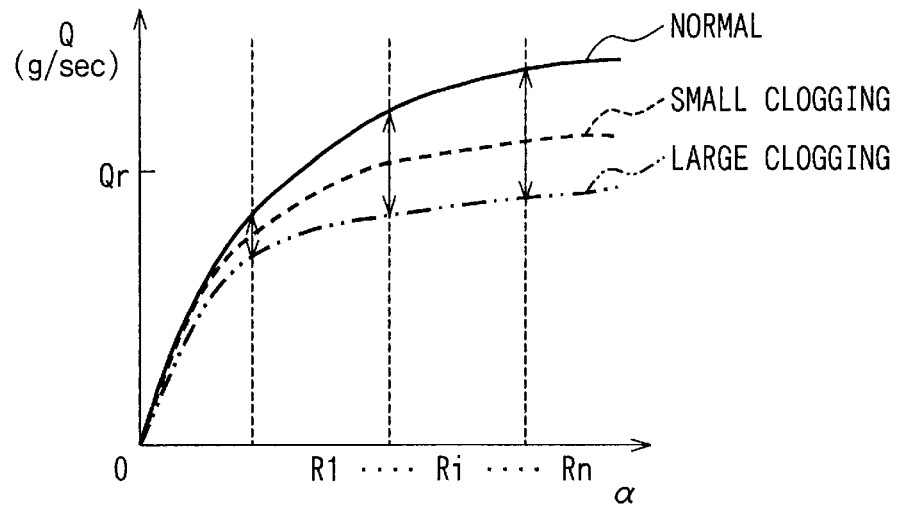
FIG. 3 is a characteristic graph indicating the relationship of intake air quantity versus throttle opening positions.

It is noted that if the clogging is determined based on a deviation of the actual throttle opening position from a reference throttle opening position corresponding to a predetermined amount of intake air Qr shown in FIG. 3, clogging cannot be detected if the predetermined amount of intake air Qr is set low which cannot be attained even when the throttle opening position is large under a large clogging condition.

However, as described above, in the first embodiment, clogging of the air cleaner is detected on the basis of a deviation between a target intake air quantity Qtg and an actual intake air quantity Q, clogging of the air cleaner can be surely detected without depending upon an actual quantity of intake air detected by an intake air quantity sensor. That is, even in the case where an amount of accumulated foreign matters increases to present a large resistance to suction, clogging can be detected under no influence of the degree of clogging on the air cleaner because the target intake air quantity is a value set according to the operating state.

Further, detection of clogging can be made in accordance with a performance of the filter due to clogging and accurate detection can be made through division into regions R1 to Rn corresponding to a throttle opening position and comparison of Qd(i) in the divided regions Ri.

The first embodiment may be modified as follows.

(1) In place of the processing at step 150, the closing may be determined directly at step 130 that clogging has occurred in the case where Qd(i) corresponding to the predetermined region Ri is larger than the predetermined value Qj(i), that is, on the basis of results of determination of one Qd(i).

(2) In place of the processing at step 160, a provisional determination may be made by comparing respective deviations Qd(i) calculated for all the regions with determination values Qj(i), which have been set every region. Provisional abnormality is assumed in the case where a deviation Qd(i) is larger than a determination value Qj(i). It is finally determined that clogging has occurred when a predetermined number of provisional abnormalities are determined in results of provisional determination in every region R1 to Rn.

(3) In a system in which the throttle opening position is varied mechanically by an accelerator pedal, a reference air quantity may be pre-stored for every region of throttle opening position. The reference air quantity is an intake air quantity supplied into the engine 11 in a state, in which no clogging occurs in the air cleaner. In place of the deviation between the target intake air quantity Qtg and the actual intake air quantity Q at step 130 in FIG. 2, a deviation between the reference air quantity and an actual intake air quantity is calculated. Thereby, in a system, in which a throttle opening position is mechanically set in accordance with that treading magnitude of an accelerator pedal, which a driver demands, clogging on the air cleaner can be accurately detected in the same manner.

(4) The relationship between a target intake air quantity Qtg and the actual intake air quantity Q is affected by an EGR system for recirculating an exhaust gas into the engine 11, an ISC system, in which a bypass passage is provided in the intake passage and a bypass valve provided in the bypass passage controls idling speed of the engine 11, and the like. In this case, in addition to the intake air quantity determined by the throttle opening position, the intake air quantity is increased corresponding to the exhaust gas. Accordingly, determination of clogging may be inhibited in the case where the quantity of the exhaust gas as recirculated exceeds a predetermined range.

Likewise, a bypass-valve opening position in addition to the throttle opening position increases an intake air quantity also in the ISC system. Hereupon, also in the case where the bypass-valve opening position exceeds a predetermined range, it may be determined that the operating state is not stable and determination of clogging may be inhibited.

Also, in the system having an atmospheric pressure sensor, it is possible to detect atmospheric pressure during the operation of the engine 11. The higher atmospheric pressure, the more an intake air quantity supplied into the engine 11. Accordingly, determination of clogging may be inhibited also in the case where the atmospheric pressure exceeds a predetermined range.

(5) In step 130, the predetermined value Qj(i) may be corrected according to a quantity of spark advance of intake valves, an engine rotating speed, cooling water temperature, a bypass-valve opening position of the EGR system, a bypass-valve opening position of the ISC valve, and the like.

Thereby, since the predetermined value Qi(j) for detection of clogging is corrected relative to those factors, which affect the relationship between the target intake air quantity Qtg and the actual intake air quantity Q, it is possible to accurately determine clogging of the air cleaner.

(6) When abnormality is detected in the filter 13 of the air cleaner by determination of clogging, detection of other abnormalities is inhibited. In this case, it is preferable that for detection of other abnormalities, a predetermined abnormality be detected on the basis of the relationship between the throttle opening position and the intake air quantity. For example, such a detection of other abnormalities includes detection of abnormality of the airflow meter 14 and so on.

(7) In a system having an intake pressure sensor, an actual intake pressure may be used in place of the intake air quantity. In this case, the target intake air quantity Qtg is set according to an operating state. The throttle opening position is set on the basis of a target intake pressure. Meanwhile, the actual intake pressure detected by the intake pressure sensor is converted into the actual intake air quantity Q by means of a map, which is preset as a function of the engine rotating speed and the actual intake pressure. The clogging of the air cleaner is detected by the comparison of the target intake air quantity Qtg as a target load and the actual intake air quantity Q obtained by conversion of the intake pressure actually detected.

(Second Embodiment)

Figure 4:
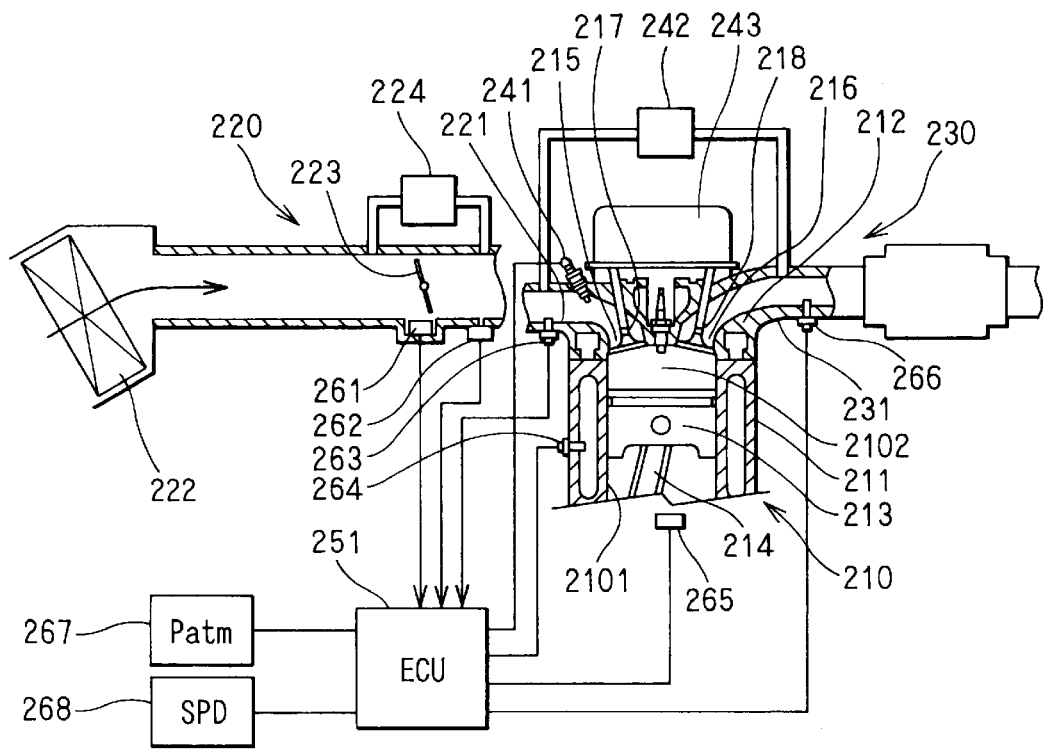
FIG. 4 is a schematic view showing an internal combustion engine to which a second embodiment of the present invention is applied.

In FIG. 4, an internal combustion engine to which the second embodiment is applied is designated with reference numeral 220. In the internal combustion engine 220, a piston 213 reciprocating in a vertical direction in the figure is arranged in a cylinder 201 formed in a cylinder block 211 of the internal combustion engine 210. The piston 213 is connected to a crankshaft (not shown) through a connecting rod 214. A cylinder head 212 covers the cylinder block 211 from the top to be mounted thereon and closes the cylinder 201 at an upper end thereof, and a combustion chamber 202 is formed above the piston 213. The combustion chamber 202 is communicated to an intake port 215 when an intake valve 217 opens, and communicated to an exhaust port 216 when an exhaust valve 218 is opened. The intake valve 217 and the exhaust valve 218 can be adjusted in opening and closing timings by a VVT (variable valve timing) unit 243.

The intake port 215 is communicated to an intake pipe 221 of an intake system 220, and the exhaust port 216 is communicated to an exhaust pipe 231.

A throttle valve 223 interlocking with an accelerator pedal (not shown) is provided downstream air cleaner 222 in the intake system 220 to adjust an intake air quantity. Also, an ISC (idle speed control) valve 224 is provided to adjust a quantity of an intake air flow bypassing the intake system 220 around the throttle valve 223. Also, an EGR (exhaust gas recirculation) valve 242 is provided to allow a part of exhaust gas flowing through the exhaust pipe 231 to be recirculated into the intake pipe 221. Also, an injector 241 is mounted on the intake pipe 221 to inject fuel into the intake port 215.

The injector 241 and so on are controlled by an electronic control unit (ECU) 251 that controls respective parts of the internal combustion engine. The ECU 251 is configured to be adapted to general internal combustion engines, and provides for a predetermined injection quantity, injection timing, or the like according to an operation magnitude of an accelerator pedal.

Operating conditions for control in the ECU 251 are provided by various sensors. Sensors for inputting detection signals into the ECU 251 include a throttle opening position sensor 261 for detecting an opening position of the throttle valve 223, a pressure sensor 262 for detecting a pressure in the intake pipe 221, which is an intake pressure, down stream of the throttle opening position sensor 261, a temperature sensor 263 for detecting an intake temperature, a crank angle sensor 265 for detecting a crank angle, from which an engine speed is calculated, and air-fuel ratio sensor 266 for detecting air-fuel ratio in the combustion chamber 202 on the basis of an oxygen concentration of the exhaust gas. Also, there are provided sensors such as provided an atmospheric pressure sensor 267 for detecting atmospheric pressure, a speed sensor 268, and so on, which are provided in general internal combustion engines.

Various controls are effected on the basis of detection signals from these sensors. Control of fuel injection quantity is also included in such controls. In controlling the injection quantity, a basic injection quantity is calculated in accordance with a map data, which is stored in a ROM of the ECU 251, on the basis of the intake pipe pressure and the engine speed.

Figure 5:
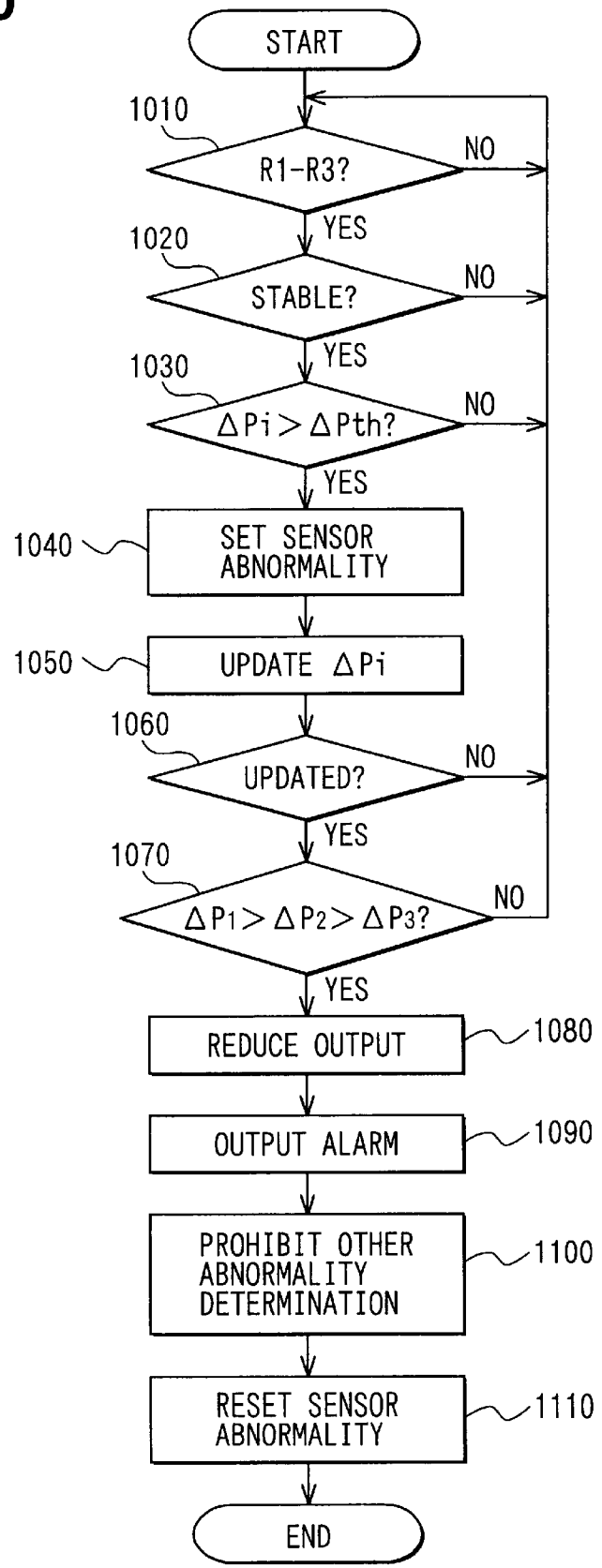
FIG. 5 is a part of flowchart showing processing for detection of leakage abnormality present in the intake system, which processing are prosecuted by an engine ECU in the second embodiment.

The ECU 251 controls the internal combustion engine 220 by executing a flowchart shown in FIG. 5. First, it is determined at step 1010 whether a detected throttle opening position α is in predetermined ranges R1, R2 and R3 which correspond to small, medium and large throttle opening positions, respectively. Assuming that α denotes a throttle opening position, R1 corresponds to $\alpha 11 \leq \alpha \leq \alpha 12$, R2 corresponds to $\alpha 21 \leq \alpha \leq \alpha 22$, and R3 corresponds to $\alpha 31 \leq \alpha \leq \alpha 32$. Here, α11 and the like representative of bounds of the regions are related to one another to be $\alpha 11 < \alpha 12 < \alpha 21 < \alpha 22 < \alpha 31 < \alpha 32$, and stored in the ROM. When step 1010 outputs a positive determination, the processing proceeds to step 1020. When a negative determination is output, the processing is returned to step 1010.

Figure 6:
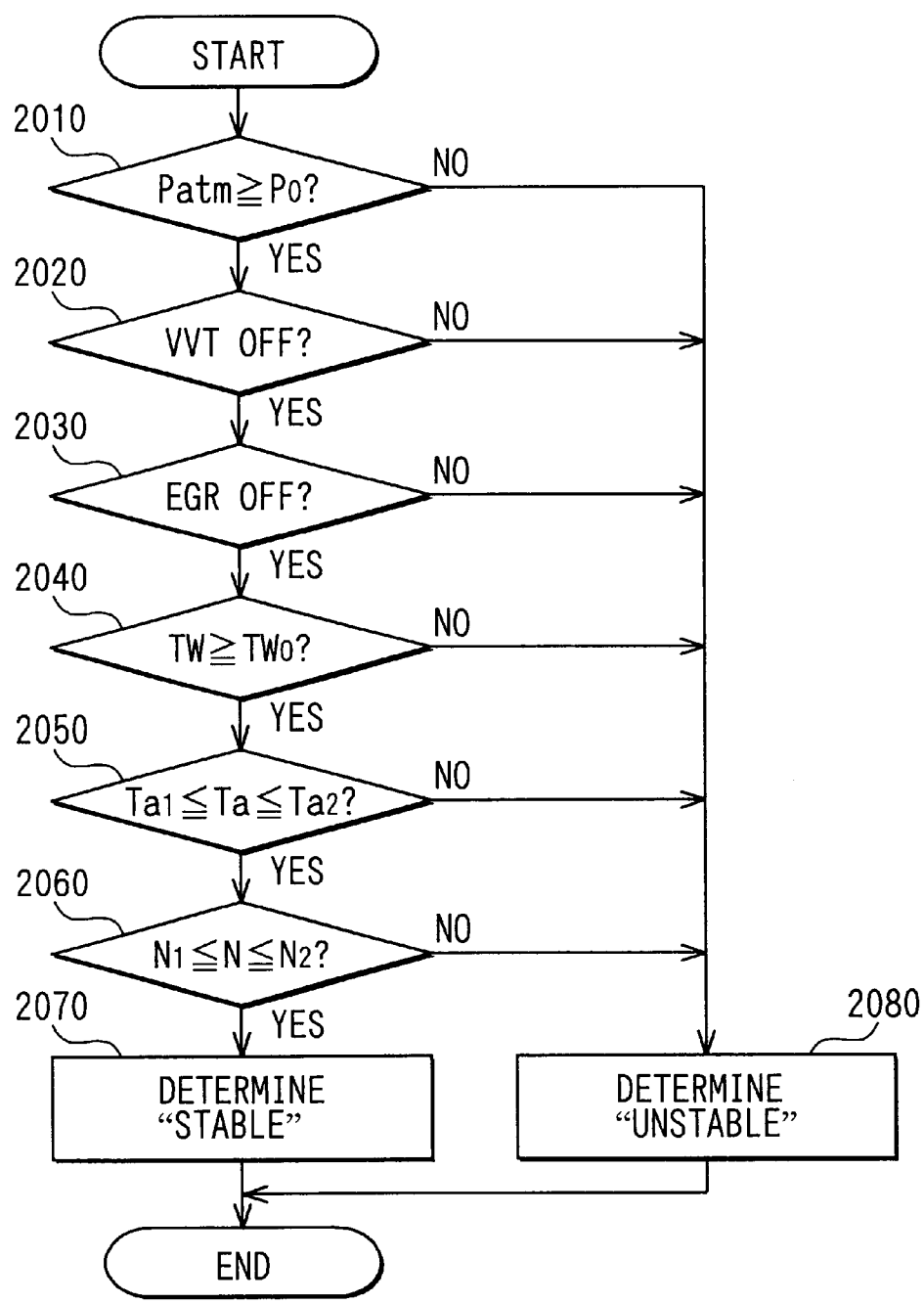
FIG. 6 is the other part of the flowchart showing processing for detection of leakage abnormality present in the intake system.

In a leakage abnormality determination inhibiting processing step 1020 determines whether an operating state is in a stable or steady state. FIG. 6 shows a flowchart for determining whether the operating state is stable. It is determined at step 2010 whether the atmospheric pressure Patm is equal to or higher than a preset pressure P0. This is intended for eliminating a leakage abnormality determination on the intake system 220 at extreme highlands, in which atmospheric pressure is low. When a positive determination is output, the processing proceeds to step 2020.

It is determined at step 2020 whether the VVT unit 243 is made OFF (inoperative). This is for eliminating a leakage abnormality determination on the intake system 220 in a state, in which the VVT unit 243 is made ON (operative) which causes fluctuation of the intake air quantity. When a positive determination is output, the processing proceeds to step 2030.

It is determined at step 2030 whether the EGR valve 242 is made OFF. This is for eliminating a leakage abnormality determination on the intake system 220 in a state, in which the EGR valve 242 is made ON which causes low accuracy of an intake air quantity measurement. When a positive determination is output, the processing proceeds to step 2040.

It is determined at step 2040 whether a cooling water temperature TW is equal to or higher than a preset temperature Tw0. This is for eliminating a leakage abnormality determination on the intake system 220 immediately after a cold starting, in which a cooling water temperature is low. When a positive determination is output, the processing proceeds to step 2050.

It is determined at step 2050 whether an intake temperature Ta is in the range of Ta1 to Ta2. This is for eliminating a leakage abnormality determination on the intake system 220 in a extreme cold atmosphere and in a high temperature atmosphere. Both Ta1 and Ta2 are preset values. When a positive determination is output, the processing proceeds to step 2060.

It is determined at step 2060 whether an engine speed N is in the range of N1 to N2. This is for eliminating a leakage abnormality determination on the intake system 220 when the number of revolutions N is low and an intake quantity itself is small and when the number of revolutions N is extremely high and an intake quantity is considerably large. When a positive determination is output, the processing proceeds to step 2070 and determines that the operating state is stable (a flag is set).

When a negative determination is output in any one of steps 2010 to 2060, the processing proceeds to step 2080, and determines that the operating state is unstable (a flag is reset).

It is determined on the basis of the flag at step 1020 whether the operating state is stable. When step 1020 outputs a positive determination, the processing proceeds to step 1030.

Step 1030 subtracts a reference intake pipe pressure from a detected intake pipe pressure to make a difference a pressure deviation $\Delta Pi$ (i=1, 2, 3) and determines whether the pressure deviation $\Delta Pi$ is greater than a predetermined value $\Delta Pth$. The pressure deviation $\Delta P1$ indicates a pressure deviation in the region R1, $\Delta P2$ indicates a pressure deviation in the region R2, and $\Delta P3$ indicates a pressure deviation in the region R3. At step 1010, the pressure deviation $\Delta Pi$ is calculated and determined for a region identified by a throttle opening position.

The reference intake pipe pressure is an intake pipe pressure when the intake system 220 is free from leakage abnormality and the operating state of the internal combustion engine is in a steady state. A pressure value in a predetermined operating state among operating states in a steady state is stored as a reference intake pipe pressure (base stored value), which constitutes a base, in the ROM, and the reference intake pipe pressure is corrected according to an operating state whereby a reference intake pipe pressure is obtained, which is conformed to the operating state when no leakage abnormality is present in the intake system 220.

The reference intake pipe pressure is corrected by multiplying the base stored value by a VVT correction value Kvvt, an EGR correction value Kegr, an atmospheric pressure correction value Katm, an ISC correction value Kisc, and a water temperature correction value Ktw.

Figure 7A:
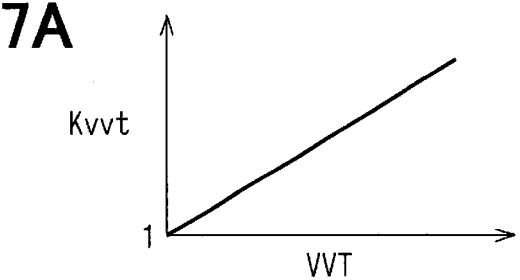
FIGS. 7A, 7B, 7C, 7D and 7E are graphs illustrating processing for detection of leakage abnormality present in the intake system.

The VVT correction value Kvvt is set in a manner to monotonously increase relative to a VVT advance quantity as shown in FIG. 7A. This is because the actual intake pipe pressure Patm increases according to the VVT advance quantity. The correction value Kvvt is also dependent upon the engine speed.

Figure 7B:
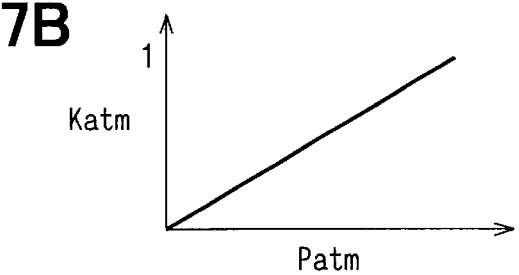

The atmospheric pressure correction value Katm is set in a manner to monotonously increase relative to the atmospheric pressure Patm as shown in FIG. 7B. This is because the actual intake pipe pressure Pi increases according to a magnitude of the atmospheric pressure Patm. The correction value Katm is also dependent upon the engine speed.

Figure 7C:
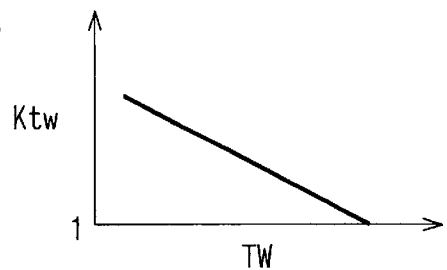

The water temperature correction value Ktw is set in a manner to monotonously decrease relative to the water temperature TW as shown in FIG. 7C. This is because the lower the water temperature TW, the higher the idling speed is set and the actual intake pipe pressure Pi increases. The correction value Ktw is also dependent upon the engine speed.

Figure 7D:
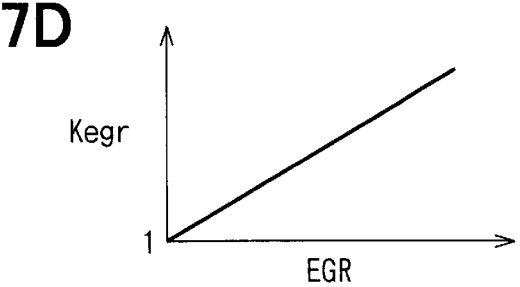

The EGR correction value Kegr is set in a manner to monotonously increase relative to the EGR quantity as shown in FIG. 7D. This is because the actual intake pipe pressure Pi increases according to the EGR quantity. The correction value Kegr is also dependent upon the engine speed.

Figure 7E:
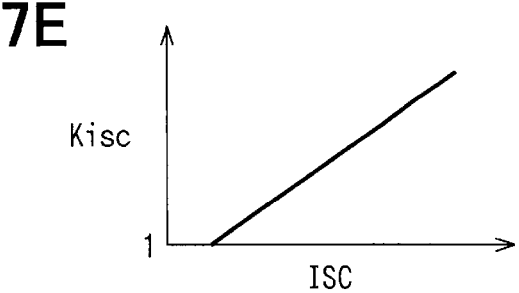

The ISC correction value Kisc is set in a manner to monotonously increase relative to the ISC opening position as shown in FIG. 7E. This is because the larger side, on which the ISC opening position is, the higher the actual intake pipe pressure Pi. The correction value Kisc is also dependent upon the engine speed.

When the pressure deviation $\Delta Pi$ is larger than the predetermined value $\Delta Pth$, step 1030 outputs a positive determination. When a negative determination is output, the processing returns to step 1010.

Step 1040 as well as step 1110 entails processing for setting of an abnormal value information to store a sensor abnormality information being the abnormal value information, in a backup RAM. The abnormal value information is assumed to be, for example, "1."

At step 1050, the pressure deviation $\Delta Pi$ calculated at step 1030 is updated, and at step 1060, it is determined whether the pressure deviation $\Delta Pi$ has been updated for all the regions R1 to R3. When a positive determination is output, the processing proceeds to step 1070. When a negative determination is output, the processing returns to step 1010.

Step 1070 entails processing for load dependency determination to determine whether $\Delta P1 > \Delta P2 > \Delta P3$ holds for the three regions R1 to R3. When a positive determination is output, the processing proceeds to step 1080, and when a negative determination is output, the processing returns to step 1010.

When the intake system 220 is free from leakage and no abnormality is present in the pressure sensor 262 on the intake pipe 221, the actual intake pipe pressure corresponds to the reference intake pipe pressure within the range of a detection error, or the like, which is conformed to the sensor characteristics, or the like. Meanwhile, when leakage abnormality is present in the intake system 220 on a downstream side of the throttle valve 223, the following state occurs. The intake pipe pressure Pi detected by the pressure sensor 262 on the downstream side of the throttle valve 223 rises according to a quantity of air inflowing from a location, at which leakage abnormality is present.

When the throttle opening position is on a small side, air flow passage has a decreased cross sectional area in a position, in which the throttle valve 223 is positioned, the intake pipe pressure tends to be negative on the downstream side of the throttle valve 223. Thus, when the leakage abnormality is present in the intake system 220, the intake air inflowing from a location, at which leakage abnormality is present, is large and pressure buildup is accordingly large.

Figures 8, 9:
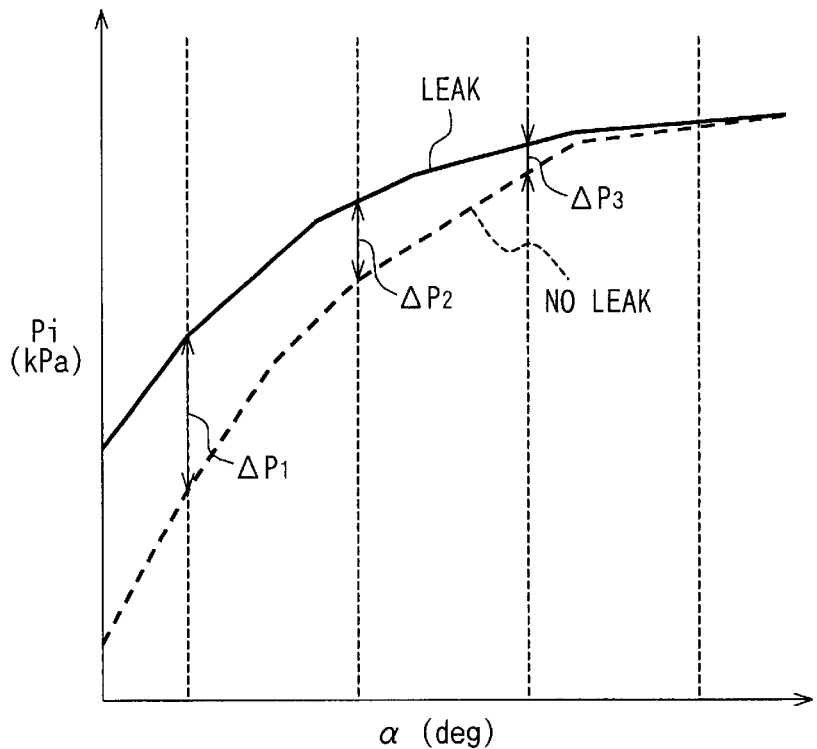
FIG. 8 is a further graph illustrating processing for detection of leakage abnormality present in the intake system.
FIG. 9 is a table illustrating processing for detection of leakage abnormality generated in the intake system.

FIG. 8 shows the relationship between the throttle opening position α and an intake pipe pressure Pi. Broken lines indicate a characteristic (reference operating characteristic) at a normal state free from leakage abnormality, and the reference intake pipe pressure is represented by the broken line. Solid line indicates a characteristic when the leakage abnormality is present. In this case, the smaller side, on which the throttle opening position is, the larger the deviation between the actual intake pipe pressure and the reference intake pipe pressure as it goes toward a low load side.

Meanwhile, even when no leakage is present in the intake system 220, a deviation between the actual intake pipe pressure and the reference intake pipe pressure becomes large in the case where abnormality occurs in the detecting characteristic of the pressure sensor 262 on the intake pipe 221, which is determined to constitute leakage in the intake system 220 in the case where the actual intake pipe pressure is only compared with a predetermined value. In contrast, according to the embodiment, abnormality in the pressure sensor 262 can be discriminated from the leakage in the intake system 220 in the following manner.

That is, even when the offset shift to a positive side is produced in the detection value of, for example, the pressure sensor 262, the pressure deviation between the actual intake pipe pressure and the reference intake pipe pressure is substantially constant independent of the magnitude of the throttle opening position. Thus, such a pressure deviation is not determined to constitute any leakage abnormality (step 1070).

In this manner, the embodiment is highly reliable in detection of abnormality and does not erroneously determine leakage abnormality in the intake system 220. Besides, the operating state, for which leakage abnormality should be determined, is restricted to a predetermined one, and the reference intake pipe pressure is corrected and made appropriate on the basis of the operating state, so that determination is high in accuracy.

In the case where step 1070 outputs a positive determination, it is determined that leakage abnormality is present, and steps 1080 to 1100 are processed.

Step 1080 entails processing for engine output management to reduce a fuel cut-off rotational speed for lowering the engine output. That is, the internal combustion engine is prohibited from running above the lowered rotation speed by the fuel cut-off. The fuel cut-off rotational speed after the reduction is set on the basis of speed, ΔP1 in the region 1, and the throttle opening position. FIG. 9 shows a map for finding the fuel cut-off rotational speed. In addition, the fuel cut-off rotational speed is set to a reference value, that is, a value of 6800 rpm when no leakage abnormality is involved, and only an excessive high rotation is inhibited.

The fuel cut-off rotational speed when leakage abnormality is present becomes low in a small throttle opening position, for which a driver intends in order to demand torque, when the vehicle speed (SPD) is above 4 km/h. This is because there is a need of suppressing engine output when the throttle opening position is on a small side and no large torque is considered necessary.

Also, the fuel cut-off rotational speed becomes low when the pressure deviation ΔP1 in the region R1 is large. This is because there is a high possibility that leakage in the intake system is large and an excessive quantity of air flows in.

Also, when the vehicle speed SPD is below 4 km/h, the rotational speed is uniformly made 2000 rpm that is a minimum fuel cut-off rotational speed. This is because the operating state is close to an engine stop state to be considered to be one in need of little torque and there is no need of dividing the fuel cut-off rotational speed with the pressure deviation ΔP1 in the region R1.

In addition, in this embodiment, the fuel cut-off rotational speed is set by the pressure deviation ΔP1 in the region R1, in which a divergence between the actual intake pipe pressure and the reference intake pipe pressure appears most noticeably when the leakage abnormality is present, but the embodiment is not necessarily limited thereto.

Step 1090 following the engine output management (step 1080) entails processing for alarming to output an alarm to the effect that leakage abnormality has been generated in the intake system 220. Such an alarm is output by lighting up an indicator on an instrument panel, or outputting an alarm sound.

Step 1100 following the alarm outputting processing (step 1090) entails processing for inhibition of detection of other abnormalities to inhibit detection of other abnormalities with respect to respective parts of the internal combustion engine. Specifically, the flag is set to store the intake system leakage abnormality occurring in the intake system 220. When such an intake system leakage abnormality flag is set, determination of other abnormalities in other abnormality determination routines is inhibited.

Alternatively, in response to the intake system leakage abnormality flag being set, information to the effect that leakage abnormality has arose in the intake system 220 is sent to other ECUs in the vehicle so that the ECUs receiving such information stop respective abnormality determination processing.

Since the leakage abnormality raises the intake pipe pressure above one estimated from the throttle opening position and hence a fuel injection quantity and a resulting engine speed is increased, it is conceivable that such increase is erroneously determined to be arising from the abnormality in a fuel supply system, or in the throttle valve 223. In the case where the leakage abnormality is determined, detection of abnormality in the fuel supply system, or the like is inhibited and the fuel supply system in a normal state is prevented from being erroneously determined to be abnormal.

At step 1110 following the processing for other abnormality determination (step 1100), the sensor abnormality information stored at step 1110 is reset.

The following advantage is provided in this step 1110 and the above step 1040. That is, provided that the leakage abnormality is not determined (step 1070) even when the pressure deviation between the actual intake pipe pressure and the reference intake pipe pressure is large, it can be determined that such a pressure deviation arose due to offset variation of the pressure sensor 262, or the like and there is a possibility of failure in the pressure sensor 262. In this case, the sensor abnormality information in the backup RAM remains "1". Thereby, it can be informed in an vehicle inspection at a service factory or the like that attention should be paid to the pressure sensor 262. Thus it is possible to readily take measures such as exchange of the pressure sensor 262, or the like. The step 1110 entails processing not relating to abnormality, such as offset variation, of the pressure sensor 262, but accompanying the determination of leakage abnormality in the intake system.

After step 1110 is performed, the processing in FIG. 5 is terminated.

The second embodiment involves three regions for the throttle opening position, in which the pressure deviation between the actual intake pipe pressure and the reference intake pipe pressure should be calculated, but more regions may do. Alternatively, two regions may do simply. It suffices that whether the larger the pressure deviation between the actual intake pipe pressure and the reference intake pipe pressure, the smaller side, on which the throttle opening position is, can be determined.

Also, while the fuel cut-off rotational speed is decreased to reduce the engine output, the air-fuel ratio of mixture may be made lean to reduce the engine output. In the processing for making the air-fuel ratio lean, a correction value for reduction in fuel is set on the basis of the vehicle speed, the pressure deviation between the actual intake pipe pressure and the reference intake pipe pressure in the region 1, and the throttle opening position.

Figures 10A, 10B, 11:
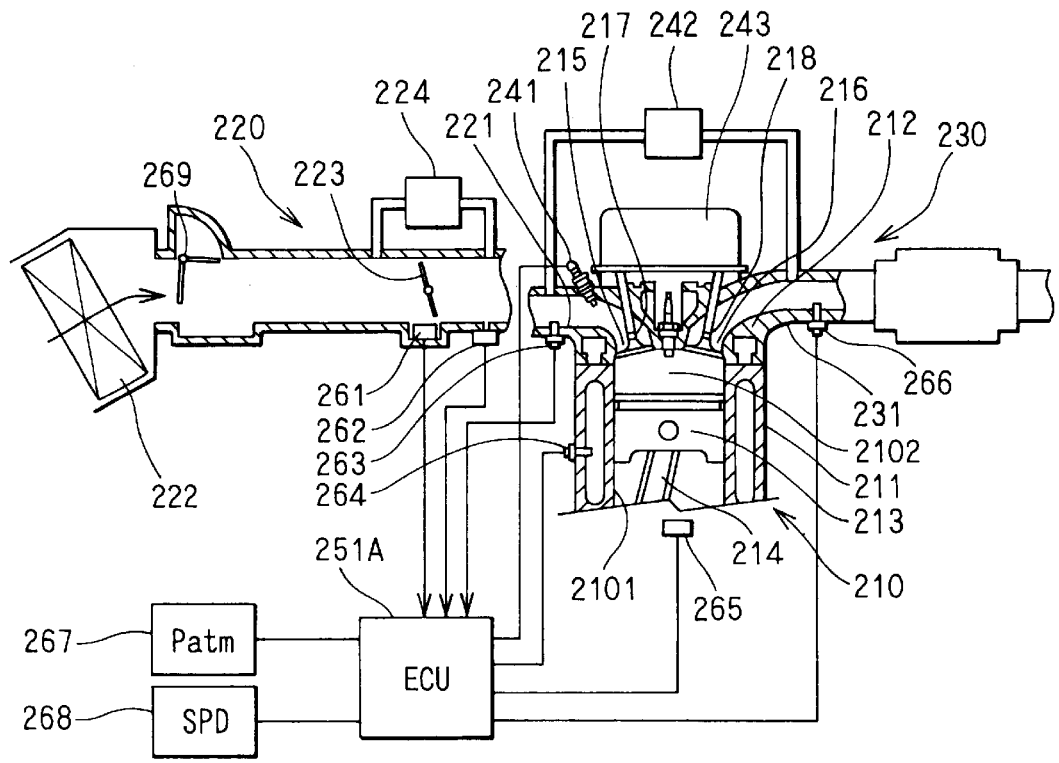
FIGS. 10A and 10B are respectively tables illustrating modified examples of processing for detection of leakage abnormality generated in the intake system.
FIG. 11 is a schematic view showing an internal combustion engine to which a third embodiment of the present invention is applied.

FIGS. 10A and 10B show maps, by which a correction value Cr for reduction in fuel is found. When the speed is above 4 km/h and the throttle opening position is above 5 degrees, correction is made on the basis of the map shown in FIG. 10A. The map is a one-dimensional one, in which one correction value Cr for engine output reduction corresponds to the pressure deviation $\Delta P1$ in the region R1. The correction value Cr for reduction is a coefficient, by which the base injection quantity is multiplied. As the pressure deviation $\Delta P1$ increases, a value smaller than 1 is given to make an injection quantity small. This is because leakage present in the intake system 220 is large to allow an excessive, actual intake quantity to inflow and the base injection quantity is given a correspondingly large value.

Also, when the vehicle speed is less than 4 km/h and the throttle opening position is less than 5 degrees, correction is made on the basis of the map data shown in FIG. 10B. Like FIG. 10A, the map is a one-dimensional one, in which one correction value for reduction corresponds to the pressure deviation $\Delta P1$ in the region R1. Likewise, as the pressure deviation $\Delta P1$ increases, a value smaller than 1 is given to make an injection quantity small, but the value is small relative to that in FIG. 10A. This is because when the vehicle speed is less than 4 km/h and the throttle opening position is less than 5 degrees, which gives a condition when the map is used, a state, in which little torque is demanded, can be assumed. Thus it is considered that it is desirable to reduce a fuel injection quantity.

In addition to the above, known processing such as a spark-delay of an ignition timing, or the like can be adopted for the engine output reduction.

(Third Embodiment)

FIG. 11 shows an internal combustion engine 220, which is a L-J system. In this system, air flow meter 269 is provided upstream the throttle valve 223 in the intake system 220 to detect an intake quantity (intake air quantity). An ECU 251A calculates a fuel injection quantity on the basis of map data determined so that the fuel injection quantity corresponds to the air quantity and the engine speed.

Figure 12:
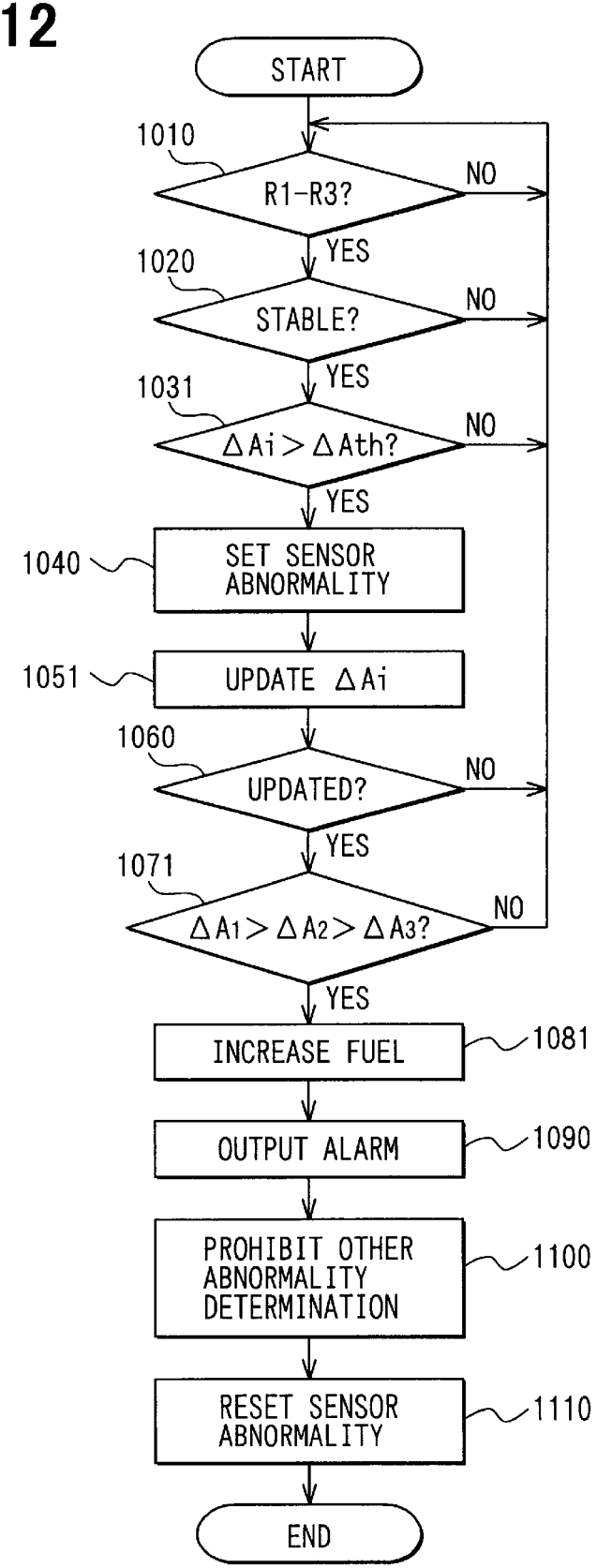
FIG. 12 is a flowchart showing processing for detection of leakage abnormality present in an intake system, which processing are prosecuted by an engine ECU of the internal combustion engine in the third embodiment.

FIG. 12 shows a flowchart of control made in the ECU 251A. Like the second embodiment, when it is determined at step 1010 and step 1020 that the throttle opening position is in any one of the regions R1 to R3 and the operating state is stable, at step 1031 an intake air quantity deviation $\Delta Ai$ (i=1, 2, 3) is calculated by subtracting the actual air quantity from a reference air quantity and it is determined whether the air quantity deviation $\Delta Ai$ is larger than a predetermined value $\Delta Ath$.

The air quantity deviation $\Delta Ai$ corresponds to the regions R1 to R3 in one-to-one. $\Delta A1$ indicates air quantity deviation in the region R1, $\Delta A2$ indicates air quantity deviation in the region R2, and $\Delta A3$ indicates air quantity deviation in the region R3. At step 1010, the air quantity deviation $\Delta Ai$ is calculated and determined for each region Ri, which is identified by the throttle opening position.

The reference air quantity is calculated by multiplying a base reference air quantity (base stored value) by all of a VVT correction value, EGR correction value, atmospheric pressure correction value, ISC correction value, and a water temperature correction value. These corrections are made in the same manner as in the second embodiment.

When step 1031 outputs a positive determination, a sensor abnormality information is set at step 1040. The air quantity deviation $\Delta Ai$ is updated by the air quantity deviation $\Delta Ai$ between the reference air quantity and the actual air quantity detected this time at step 1051.

When updating is completed for all the regions R1 to R3 at step 1060, it is determined whether $\Delta A1 > \Delta A2 > \Delta A3$ holds for the air quantity deviation $\Delta Ai$. When a positive determination is output, the processing proceeds to step 1081, and when a negative determination is output, the processing returns to step 1010.

When the intake system 220 suffers from no leakage and no abnormality occurs in the detecting characteristic of the air flowmeter 269, the actual air quantity corresponds to the reference air quantity in the range of detection errors. Meanwhile, in the case where leakage abnormality occurs downstream the throttle valve 223 in the intake system 220, it goes as follows.

As described above, when the throttle opening position is on a small side, a passage has a decreased cross sectional area in a position, in which the throttle valve 223 is positioned. Thus, the intake pipe pressure tends to be negative on the downstream side of the throttle valve 223. When leakage abnormality is present in the intake system 220, the quantity of air inflowing from a location, at which leakage abnormality is present, is large and pressure buildup is accordingly large. Accordingly, a pressure difference between the upstream side and the downstream side of the throttle valve 223 is small as compared with that in the normal state, in which no leakage abnormality is present. As a result, the smaller side, on which the throttle opening position is, the larger the air quantity deviation $\Delta Ai$. FIG. 13 shows the relationship between the throttle opening position and the intake air quantity. The broken line indicates the relationship in the normal state free from leakage abnormality, and the reference air quantity is represented by the broken line. The solid line indicates the relationship when leakage abnormality is present, and the smaller side, that is, the lower load side, on which the throttle opening position is, the larger the deviation between the actual air quantity and the reference air quantity.

Meanwhile, even when the intake system 220 suffers from no leakage, in the case where abnormality occurs in the detecting characteristics of the air flow meter 269, the deviation between the actual air quantity and the reference air quantity becomes large and is determined to correspond to leakage abnormality in the intake system 220 in the case of only comparison between the actual air quantity and the predetermined value.

In contrast, in the third embodiment, abnormality in the air flow meter 269 can be discriminated from leakage abnormality in the intake system 220. More specifically, even when the offset shift to the negative side is produced in the detection value of, for example, the airflow meter 269, the air quantity deviation between an actual air quantity and the reference air quantity is substantially constant independent of the magnitude of the throttle opening position, and so is not determined to constitute any leakage abnormality (step 1071).

In this manner, the third embodiment involves a high reliability in detection of abnormality and does not erroneously determine leakage abnormality in the intake system 220.

Step 1081 entails processing for increasing the injection quantity and prosecutes processing for increasing the fuel injection quantity. In the fuel injection quantity increasing processing, the increase correction coefficient is obtained according to map data shown in FIG. 14. The fuel injection quantity is modified by multiplying the base injection quantity by the correction coefficient. The base injection quantity is calculated on the basis of the actual air quantity detected, and the injection quantity is in accordance with the base injection quantity in the case where no leakage abnormality is involved in the intake system.

The data map is a two-dimensional one, in which one increase correction coefficient corresponds to the air quantity deviation $\Delta A1$ and the throttle opening position in the region R1. The increase correction coefficient becomes large in the small throttle opening position, for which a driver intends in order to demand torque. The reason for this is that since leakage abnormality in the intake system 220 acts in a direction, in which an actual air quantity is increased from the detected air quantity, there is a need of further increasing the fuel injection quantity rather when the throttle opening position is on a small side and the large torque is assumed not to be necessary.

Also, the larger the air quantity deviation ΔA1 in the region R1, the larger the corrected quantity. This is because it is highly possible that the actual air quantity detected becomes small relative to the actual air quantity.

In this manner, when leakage abnormality is present in the intake system 220, fuel is increased to match the actual air quantity, so that engine stall possibly caused by an extreme leanness can be avoided and a necessary limp-home (retreat) traveling can be ensured even when the leakage abnormality is large.

In addition, since the engine output is increased as the fuel is corrected to be increased, the increase correction value is set in that range, in which the fuel injection quantity is prevented from being excessively increased, that is, any uncomfortable feeling is given to a driver. Alternatively, the processing for reduction corresponding to an increase in output may be performed besides. For example, a spark-delay processing can be performed for an ignition timing. For the ignition timing, a base ignition timing is calculated on the basis of the air quantity and the number of revolutions, and corrected according to the map data. FIG. 15 shows an example of such a map. The larger the air quantity deviation ΔA1 in the region R1, and the smaller side, on which the throttle opening position is, that is, the larger the correction value of the fuel injection quantity, the spark-delay amount shifts to the spark-delay side.

In addition, the embodiment takes notice of leanness of air-fuel mixture produced when the leakage abnormality is present in the intake system and makes sure ensuring of the limp-home traveling by means of the fuel increase correction. It is however not necessarily limited thereto and which processing should be performed when the leakage abnormality is present in the intake system is optional.

While according to the respective embodiments a sensor abnormality information is stored in the backup RAM to be used in diagnosis in service factories or the like, it is not always necessary to store the abnormality information according to specifications as required.

Also, the throttle opening position is used as a load parameter, but this is not limited. Any factors other than the throttle valve may be used. For example, air quantity may be detected as a load in the D-J system, and the intake pipe pressure may be detected in the L-J system.

The present invention should not be limited to the disclosed embodiments, but may be modified in various ways without departing from the spirit of the invention.

What is claimed is:

1. A device for detecting failure of an intake system for an internal combustion engine having air cleaner provided in an intake passage of an internal combustion engine, and a throttle valve provided in the intake passage to adjust an amount of intake air flowing in the intake passage, the device comprising:

a load detecting means provided downstream of the air cleaner for detecting an actual load of the internal combustion engine;

a throttle opening position detecting means for detecting an opening position of the throttle valve;

a reference load storing means for storing a reference load of the internal combustion engine for each opening position of the throttle valve; and a failure determining means for determining whether a failure is present in the intake system based on the actual load detected by the load detecting means and the reference load, for each opening position of the throttle valve detected by the throttle opening position detecting means.

2. The intake system failure detecting device according to claim 1, further comprising:

a deviation calculating means for calculating, for each opening position of the throttle valve detected by the throttle opening position detecting means, a deviation between the actual load detected by the load detecting means and the reference load corresponding to the opening position of the throttle valve, wherein the clogging determining means determines that clogging is present in the air cleaner when the deviation calculated by the deviation calculating means is more than a predetermined level.

3. The intake system failure detecting device according to claim 2, wherein the clogging determining means determines that clogging is present in the air cleaner when the calculated by the deviation calculating means is more than the predetermined level for at least two regions corresponding to the opening positions of the throttle valve.

4. The intake system failure detecting device according to claim 3, wherein the clogging determining means determines that clogging is present in the air cleaner when the deviation calculated for each region increases sequentially from a small throttle opening position range to a large throttle opening position range.

5. The intake system failure detecting device according to claim 1, further comprising:

a correction means for correcting the reference load based on a specific parameter relating to a control of the internal combustion engine.

6. The intake system failure detecting device according to claim 1, wherein the clogging determining means is inhibited from making determination of clogging of the air cleaner when the specific parameter relating to the control of the internal combustion engine is outside a predetermined range.

7. The intake system failure detecting device according to claim 6, wherein the specific parameter includes at least one of an engine rotating speed, atmospheric pressure, quantity of advance of variable valve timing device, recirculating amount of exhaust gas, idling control quantity, cooling water temperature, and ignition timing.

8. A device for detecting failure of an intake system for an internal combustion engine having air cleaner provided in an intake passage of an internal combustion engine and a throttle valve provided in the intake passage to adjust an amount of intake air flowing in the intake passage, the device comprising:

a target load setting means for setting a target load of the internal combustion engine based on an operating state of the internal combustion engine;

a load detecting means provided downstream the air cleaner for detecting an actual load on the internal combustion engine;

a throttle opening position setting means for setting an opening position of the throttle valve based on the target load set by the target load setting means; and clogging determining means for determining whether clogging is present based on the target load set by the target load setting means and the actual load detected by the load detecting means.

9. The intake system failure detecting device according to claim 8, further comprising:
a deviation calculating means for calculating, for each opening position of the throttle valve set by the throttle opening position setting means, a deviation between the actual load detected by the load detecting means and the target load set by the target load setting means,
wherein the clogging determining means determines that clogging is present in the air cleaner when the deviation between the target load and the actual load calculated by the deviation calculating means is larger than a predetermined reference.

10. The intake system failure detecting device according to claim 9,
wherein the clogging determining means determines that clogging is present in the air cleaner based on that the deviation between the target load and the actual load calculated by the deviation calculating means for at least two regions of the opening positions of the throttle valve.

11. The intake system failure detecting device according to claim 10,
wherein the clogging determining means determines that clogging is present when the deviation increases sequentially from a small throttle position region to a large throttle position region.

12. The intake system failure detecting device according to claim 8, further comprising:
a correction means for correcting the target load based on a specific parameter relating to a control of the internal combustion engine.

13. The intake system failure detecting device according to claim 8,
wherein the clogging determining means is inhibited from making determination of clogging of the air cleaner when the specific parameter relating to the control of the internal combustion engine is outside a predetermined range.

14. The intake system failure detecting device according to claim 13,
wherein the specific parameter includes at least one of an engine rotating speed, atmospheric pressure, quantity of advance of variable valve timing device, recirculating amount of exhaust gas, idling control quantity, cooling water temperature, and ignition timing.

15. The intake system failure detecting device according to claim 8,
wherein other abnormality detecting means for detecting other abnormality is inhibited from carrying out detection of abnormality in a case where the clogging determining means determines that clogging is present in the air cleaner.

16. A device for detecting failure of an intake system for an internal combustion engine having air cleaner provided in an intake passage of an internal combustion engine, the device comprising:
clogging determining means for determining clogging of the air cleaner; and
other abnormality detecting means for detecting other abnormality,
wherein the other abnormality detecting means is inhibited from carrying out detection of abnormality when it is determined that clogging is present in the air cleaner.

17. The intake system failure detecting device according to claim 16,
wherein the other abnormality detecting means includes a means for detecting a predetermined abnormality based on a load of the internal combustion engine.

18. The intake system failure detecting device according to claim 8,
wherein the load is an intake air quantity or an intake pressure of the internal combustion engine.

19. The intake system failure detecting device according to claim 8,
wherein the clogging determining means determines whether clogging is present only when an operating state of the internal combustion engine is stable.

20. The intake system failure detecting device according to claim 8,
wherein the clogging determining means determines whether clogging is present when a deviation between the target load and the actual load calculated for each throttle opening position increases as the throttle opening position increases.

21. An intake system failure detecting device for an internal combustion engine, in which a fuel injection quantity is set based on a detection value of air sucking state in an intake system, to detect leakage abnormality of the intake system downstream a throttle valve by making a comparison between a detection value of an intake air sucking state and a reference value of an intake air sucking state at the time of normality free from the leakage abnormality, the device comprising:
a load dependency determination means for making a comparison between the detection value of the air sucking state and a reference value set corresponding to a load on the internal combustion engine to determine whether the difference between the reference value and the detection value in each of a plurality of loads different in magnitude becomes larger as the load becomes lower,
wherein the leakage abnormality is determined in response to a positive determination of the load dependency determination means indicating that the difference becomes larger as the load becomes lower.

22. The intake system failure detecting device according to claim 21, further comprising:
a change width determination means for making a comparison between the detection value of the air sucking state and the reference value to determine whether the detection value is beyond a predetermined range from the reference value,
wherein the leakage abnormality is determined in response to a positive determination of the change width determination means indicating that the detection value is beyond the predetermined range.

23. The intake system failure detecting device according to claim 22, further comprising:
an information setting means for setting information indicating that the detection value of the sucking state assumes an abnormal value when the change width determination means makes the positive determination, and for resetting the information when the load dependency determination means makes the positive determination.

24. The intake system failure detecting device according to claim 21, further comprising:
a correction means for correcting the reference value on the basis of an operating state of the internal combustion engine.

25. The intake system failure detecting device according to claim 21, further comprising:

a leakage abnormality determination inhibiting means for determining whether an operating state of the internal combustion engine is in a preset predetermined state, and inhibiting determination of the leakage abnormality when the operating state is in the preset predetermined state.

26. The intake system failure detecting device according to claim 25, wherein the predetermined state is a steady state of the internal combustion engine.

27. The intake system failure detecting device according to claim 21, further comprising:

an alarm means for generating an alarm when the leakage abnormality is determined.

28. The intake system failure detecting device according to claim 21, further comprising:

an output decreasing means for decreasing an output of the internal combustion engine when the leakage abnormality is determined, wherein the sucking state includes an intake pressure downstream the throttle valve.

29. The intake system failure detecting device according to claim 28, wherein the output decreasing means increases a magnitude of decrease of the output as the load becomes lower.

30. The intake system failure detecting device according to claim 28, wherein the output decreasing means increases a magnitude of decrease of the output as the difference between the detection value of the sucking state and the reference value increases.

31. The intake system failure detecting device according to claim 28, wherein the output decreasing means increases a magnitude of decrease of the output as a vehicle speed becomes lower.

32. The intake system failure detecting device according to claim 21, further comprising:

an injection quantity increasing means for increasing a fuel injection quantity when the leakage abnormality is determined, wherein the sucking state includes an intake air quantity upstream of the throttle valve.

33. The intake system failure detecting device according to claim 32, wherein the injection quantity increasing means increases a width of an increase in injection quantity as the load decreases.

34. The intake system failure detecting device according to claim 32, wherein the injection quantity increasing means increases a width of an increase in injection quantity as the difference between the detection value of the sucking state and the reference value increases.

35. The intake system failure detecting device according to claim 32, further comprising:

an output decreasing means for decreasing an output of the internal combustion engine when the leakage abnormality is determined.

36. The intake system failure detecting device according to claim 28, further comprising:

an other abnormality detection inhibiting means for inhibiting detection of abnormality other than the leakage abnormality in the intake system when the leakage abnormality is determined.

37. An intake system failure detecting device for internal combustion engines for detecting leakage abnormality of an intake system downstream a throttle valve, the device comprising:

a change width determination means for making a comparison between a detection value of an intake air sucking state and a reference value set corresponding to a load on the internal combustion engine to determine whether the detection value is beyond a predetermined range from the reference value; and an information setting means for setting information indicating that the detection value of the sucking state is an abnormal value, when the change width determination means makes a positive determination indicating that the detection value is beyond the predetermined range, and for resetting the information when the leakage abnormality is finally determined.

38. A system for an internal combustion engine in which a fuel injection quantity is determined based on a detection value of an intake air sucking state in an intake system, the system comprising:

an intake system failure detecting device for detecting leakage abnormality of the intake system downstream a throttle valve; and an injection quantity increasing means for increasing a fuel injection quantity when the leakage abnormality is determined.

39. A system for an internal combustion engine in which a fuel injection quantity is determined based on a detection value of an intake air sucking state in an intake system, the system comprising:

an intake system failure detecting device for detecting leakage abnormality of the intake system downstream a throttle valve; and an other abnormality detection inhibiting means for inhibiting detection of abnormality other than the leakage abnormality in the intake system when the leakage abnormality is determined.

40. An intake system failure detecting method for an internal combustion engine comprising the steps of:

detecting air intake condition of the internal combustion engine;

detecting a load condition of the internal combustion engine to determine a reference of the air intake condition from a plurality of references that are set in correspondence with a plurality of load condition regions;

calculating a deviation of the detected air intake condition from the determined reference;

comparing a plurality of deviations calculated over the plurality of load condition regions; and determining a failure of an intake system of the internal combustion engine when the compared deviations change in a predetermined increasing or decreasing direction over the plurality of load condition regions.

* * * * *